United States Patent [19]

Mitamura

[11] Patent Number: 5,084,116
[45] Date of Patent: Jan. 28, 1992

[54] ROLLING CONTACT ELEMENT STEEL AND ROLLING BEARING MADE THEREOF

[75] Inventor: Nobuaki Mitamura, Kawasaki, Japan

[73] Assignee: Nippon Seiko Kabushiki Kaisha, Tokyo, Japan

[21] Appl. No.: 560,445

[22] Filed: Jul. 31, 1990

[30] Foreign Application Priority Data

Jul. 31, 1989 [JP] Japan ............................. 1-199120

[51] Int. Cl.$^5$ .......................... C23C 8/22; F16C 33/00
[52] U.S. Cl. ................................. 148/319; 148/16.5; 148/16.6; 148/318; 384/492; 384/625
[58] Field of Search ............. 148/16.5, 16.6, 316, 148/318, 319; 428/610, 627; 384/492, 625, 912, 913

[56] References Cited

U.S. PATENT DOCUMENTS

| 2,837,421 | 6/1958 | Kron .............................. 75/126 |
| 3,117,041 | 1/1964 | Kolstinen ....................... 148/333 |
| 3,275,389 | 9/1966 | Neilson et al. .................. 384/95 |
| 3,885,995 | 5/1975 | Cunningham et al. ........ 148/16.5 |
| 4,023,988 | 5/1977 | Stickels et al. ................. 148/12.4 |
| 4,191,599 | 3/1980 | Stickels et al. ................. 148/16.5 |
| 4,930,909 | 6/1990 | Murakami et al. ............. 384/492 |

FOREIGN PATENT DOCUMENTS

| 889248 | 12/1971 | Canada . |
| 52-33821 | 3/1977 | Japan . |
| 52-130415 | 11/1977 | Japan . |
| 57-164977 | 10/1982 | Japan . |
| 60-21359 | 2/1985 | Japan . |
| 63-62847 | 3/1988 | Japan . |
| 857308 | 12/1960 | United Kingdom . |
| 977138 | 12/1964 | United Kingdom . |
| 1174414 | 12/1969 | United Kingdom . |
| 1181940 | 2/1970 | United Kingdom . |
| 1441032 | 6/1976 | United Kingdom . |
| 1460336 | 1/1977 | United Kingdom . |
| 1488109 | 10/1977 | United Kingdom . |
| 1585445 | 3/1981 | United Kingdom . |
| 2187202 | 9/1987 | United Kingdom . |

Primary Examiner—R. Dean
Assistant Examiner—Robert R. Koehler
Attorney, Agent, or Firm—Basile and Hanlon

[57] ABSTRACT

A rolling contact element steel has C: 0.2-0.6 wt %; Si: 0.5-2.0 wt %; Cr: 5.0-8.0 wt %; Mo: 3.0 wt % or less; Mn: 1.6 wt % or less; O: 12 ppm or less; and the balance of Fe and an inevitable impurity. A rolling bearing made of this steel will not soften even at high temperature. The dimensional stability at high temperature and wear-resistance of the steel are superior. The steel can produce a fine carbide without the need for a separate heat treatment. A rolling bearing has at least one of the races and the rolling element made of the steel, the steel being carburized or carbonitrided, then quenched and finally high-temperature tempered.

4 Claims, 3 Drawing Sheets

ROLLING CONTACT ELEMENT STEEL AND ROLLING BEARING MADE THEREOF

BACKGROUND OF THE INVENTION

1. Field of the Invention

The present invention relates to rolling bearings used, e.g., with automotive vehicles, agricultural machinery, construction machinery and iron-and-steel machinery, and, more particularly, to long-life rolling bearings required for use in transmissions and engines.

2. Description of the Related Art

A rolling bearing is typically in a severe use under high surface pressure so as to experience a repeated shearing stress. In order to endure the repeated shearing stress and secure long rolling fatigue life (hereinafter referred to as life), a rolling bearing which is made of high-carbon chromium steel (e.g., JIS-SUJ2), then quenched and tempered so as to have a 58-64 $H_RC$ hardness has been used. On the other hand, there is a prior-art rolling bearing which is made of case hardened steel in order to increase its life. This prior-art case hardening steel rolling bearing has been made of a low-carbon case hardened steel of a good hardenability, e.g., JIS-SCR420H, -SCM420H, -SAE6820H or -SAE43-20H, since a hardness curve of the case hardened steel rolling bearing must be determined in accordance with an internal shearing stress distribution created by a contact surface pressure. Then, this case hardening steel rolling bearing has been carburized or carbonitrided, quenched and tempered and thus has secured a required life so that the races of the case hardened steel rolling bearing have 58-64 $H_RC$ surface or case hardnesses and 30-48 $H_RC$ core hardnesses.

The load on a machine using a rolling bearing has increased and a rotational speed of the machine has increased so that service conditions of the rolling bearing has become more severe, and the rolling bearing has been used under a quasi-high temperature which has caused the following problems:

First, an increase in the service temperature of a rolling bearing decreases the hardness of the rolling bearing resulting in a plastic deformation in the rolling bearing which decreases the life of the rolling bearing. Second, using a rolling bearing at a high temperature can break an oil film between the races and rolling elements of the rolling bearing so that boundary lubrication fails to occur resulting in an acceleration in the wearing in the rolling contact elements of the rolling bearing. Third, some of retained austenite present in an element of the rolling bearing transforms to martensite at a high temperature so that the size of the element changes thereby damaging the dimensional stability of the rolling bearing.

Thus, in order to preferentially secure the dimensional stability of the rolling bearing used at a quasi-high temperature, a high-temperature tempered type of high-carbon chromium bearing steel (JIS-SUJ2) in which the high-carbon chromium bearing steel has been high-temperature tempered so as to previously transform retained austenite in the rolling contact elements of the rolling bearing to martensite to thereby increase the dimensional stability of JIS-SUJ2 has been conventionally provided.

Precipitation-hardened steel, such as M50, high-temperature bearing, high-speed steel with Cr, Mo and V, has been provided as a material for a high-temperature rolling contact element in addition to the high-temperature tempered type of JIS-SUJ2 steel. M50 is a high-temperature bearing, high-speed steel which is high-temperature tempered to precipitate an alloy carbide so as to provide a sufficient high-temperature service strength to a rolling bearing.

In addition, in order to increase the life of a rolling bearing, the service temperature of which can be a quasi-high temperature to high temperature, a wear-resistant carburized steel of Unexamined Japanese patent application publication No. SHO 52-130415 or a case hardened steel of Unexamined Japanese patent application publication No. SHO 57-164977 can alternatively be used as the material for the rolling contact element.

The high-temperature tempered type of JIS-SUJ2 steel increases the dimensional stability while the high-temperature tempering decreases the hardness of the high-temperature tempered type of JIS-SUJ2 steel to thereby decrease the life of a corresponding rolling bearing due to a plastic deformation in a rolling contact element made of a high-temperature tempered type of JIS-SUJ2 steel. In addition, an insufficient wear resistance of the high-temperature tempered type of JIS-SUJ2 remarkably accelerates wear in the rolling bearing under a boundary lubrication during a high temperature service.

In addition, since the concentration of carbon in M50 precipitation-hardened steel is high and M50 precipitation-hardened steel in the stage of a material for a rolling contact element of a rolling bearing has macrocarbides of Cr, Mo and V, the workability of M50 in pretreatment is poor. On the other hand, the macrocarbides cause a stress concentration therearound which can result in a flaking from the place of the stress concentration to thereby decrease the life of a corresponding rolling bearing with a rolling contact element made of M50. In addition, the workability of M50 in preworking of the rolling bearing with a rolling contact element made of M50 is poor. Thus, M50 must be solution heat treated at a high temperature (about 1,100° C.) in order to dissolve the macrocarbides into the matrix of M50 and then particularly heat treated in order to refine the resulting carbides. This requires a separate heat treatment step and decreases the productivity of the heat treatment.

The wear-resistant carburized steel of the Unexamined Japanese patent application publication No. SHO 52-130415 has large contents of Mo and Cr so that the sizes of the carbides of Mo and Cr can be large.

The case hardened steel of the Unexamined patent application publication No. SHO 57-164977 has a large content of carbon so that the size of a carbide can be large and, on the other hand, the content of retained austenite in the case hardened races or rolling elements is great so that the dimensional stability of this case hardened steel is decreased.

Therefore, in order to solve the above problems, a primary object of the present invention is to provide a rolling contact element steel which will not soften even at high temperature and the dimensional stability at high temperature and the wear-resistance of which are superior and which can produce a fine carbide without the need for a separate heat treatment. A secondary object of the present invention is to provide a rolling bearing which is made of the inventive rolling contact element steel and has a long life even under use at a high temperature.

SUMMARY OF THE INVENTION

In order to achieve the primary object, a first aspect of the present invention provides a rolling contact element steel consisting essentially of C: 0.2–0.6 wt %; Si: 0.5–2.0 wt %; Cr: 5.0–8.0 wt %; Mo: 3.0 wt % or less; Mn: 1.6 wt % or less; O: 12 ppm or less; and the balance of Fe and an inevitable impurity.

This rolling contact element steel may further include V: 1.0 wt % or less.

In order to achieve the secondary object, a second aspect of the present invention provides a rolling bearing comprising races and rolling elements, at least one of the races and rolling elements being made of an alloy steel consisting essentially of C: 0.2–0.6 wt %; Si: 0.5–2.0 wt %; Cr: 5.0–8.0 wt %; Mo: 3.0 wt % or less; Mn: 1.6 wt % or less; O: 12 ppm or less; and the balance of Fe and an inevitable impurity, at least one of the races and rolling element, being carburized or carbonitrided, then quenched and then high-temperature tempered.

This rolling contact element steel may further include V: 1.0 wt % or less. The particle size of a carbide precipitated by the heat treatments in the surface layer of at least one of the races and the rolling element of the rolling bearing is preferably 0.5–1.0 μm and the content of the carbide preferably is 20–50 vol %. The temperature of the high-temperature tempering is preferably 250°–550° C.

One feature of the present invention is that Si, Cr, Mo and desirably V are added to low or medium carbon steel. Adding Si, Cr, Mo and desirably V increases the temper softening resistance of the lower medium carbon steel in order to suppress a reduction in the hardness of the low or medium carbon steel caused by the high-temperature tempering and impede a high-temperature softening of the low or medium carbon steel.

High-temperature tempering the low or medium carbon steel precipitation-hardens the carbides of Cr, Mo and V to produce a high-temperature high hardness on a rolling contact element steel of the present invention. Thus, even when the rolling contact element parts, such as said races or rolling elements of the rolling bearing, are high-temperature tempered in order to reduce retained austenite present in the rolling contact element parts which adversely affects the dimensional stability of the rolling contact element parts, a reduction in the hardness of the rolling contact element parts, such as said races or rolling elements, can be eliminated.

Since the matrix of the rolling contact element steel is made of the low or medium carbon steel, the material for the rolling contact element parts resists the production of a macrocarbide. Thus, the rolling contact element steel requires neither complicated solution heat treatment for the macrocarbide nor a separate high-temperature treatment equipment, e.g., a salt bath.

The sequence of carburizing or carbonitriding the rolling contact element parts made of the low or medium carbon steel, then quenching and then tempering the low or medium carbon steel produces fine carbides in the surface layer or the rolling contact element parts. The fine carbides reduce a stress concentration in the rolling contact element parts so that the rolling contact element parts resist the occurrence of a flaking to thereby increase the life of the rolling bearing with the contact element parts made of the rolling contact element steel. The fine carbides present in the surface layer of the rolling contact element parts increase the water resistance of the rolling contact element parts.

Herein, the surface layer of the present invention is defined as a $(1-2) \times Z_o$ deep layer of each of the races and rolling element parts of the rolling bearing from a rolling contact surface of the rolling contact element when $Z_o$ represents a position (i.e., depth) of maximum shearing stress. The preferred embodiments of the present invention have, e.g., about 0.2–0.5 mm order thick surface layers. The depth of the surface layer is computed from a value of a surface pressure applied to the rolling contact surface of each of the races and the rolling element parts.

DESCRIPTION OF THE INVENTION

Figure 1:
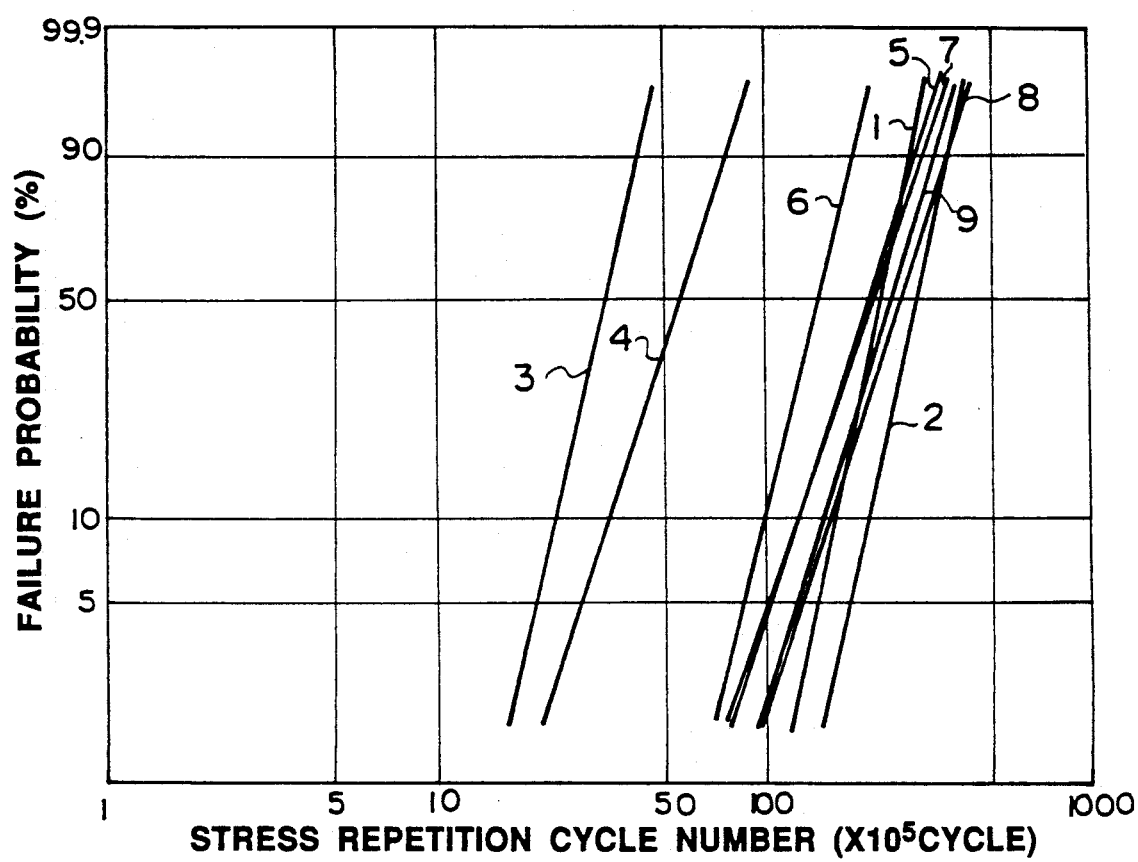
FIG. 1 is a characteristic graph of a rolling thrust bearing under a quasi-high-temperature service representing the results of a rolling thrust bearing life test in terms of a relationship between the stress repetition cycle number and the failure probability of the rolling thrust bearing.

The operation of the included elements of the present invention and the critical significance of the contents of the included elements will be described hereinafter.

C: 0.2–0.6 wt %

C was required to increase the hardness of the rolling contact element parts which had been quenched and tempered. The captioned values represent the content of C present in the core of the rolling contact element parts so that a carburization or carbonitriding increases a case carbon concentration of the rolling contact element parts.

Above 0.6 wt % content of C caused a macrocarbide in the stage of material of the rolling contact element steel for the rolling contact element which decreases the tenacity and rupture strength of the rolling contact element parts. In addition, the greater the content of C, the greater the content of retained austenite in the rolling contact element parts. In particular, above 0.6 wt % content of C significantly increased the content of retained austenite to thereby change the dimensions of the rolling contact element parts at a high temperature which causes a deterioration of the dimensional stability of the rolling contact element parts.

On the other hand, below 0.2 wt % content of C required a significantly longer time for carburization or carbonitriding which decreases the heat-treatment productivity of the rolling contact element parts. Thus, the content of C was limited within the captioned range.

Si: 0.5–2.0 wt %

In-steel Si was effective to solution reinforcement and an increase of the temper softening resistance of the rolling contact element parts. The content of Si had to be 0.5 wt % or more in order to exert the desired operation of Si. However, the greater the content of Si, the lower the mechanical strength of the rolling contact element parts. In addition, Si has a carburization impedance. Thus, the upper limit of the content of Si was 0.2 wt %.

Cr: 5.0–8.0 wt %

Cr increased the temper softening resistance of the rolling contact element parts. High-temperature tempering the rolling contact element parts produced fine carbides to thereby precipitation-harden the rolling contact element parts. Thus, even high-temperature tempering the rolling contact element parts produced a sufficient hardness in the rolling contact element parts. In addition, carburizing or carbonitriding the rolling contact element parts precipitated a hard and fine chromium carbide in the case or surface layer of the rolling contact element parts to thereby increase the wear resistance of the rolling contact element parts.

In order to achieve the above-described operations of Cr and to secure a required surface hardness (preferably 62–70 $H_RC$) of the rolling contact element parts, the lower limit of the content of Cr was 5.0 wt %. On the other hand, above 8.0 wt % content of Cr produced a macrocarbide in the rolling contact element parts in the stage of material of the rolling contact element parts so as to cause a stress concentration about the macrocarbide which decreases the life of the rolling bearing. Thus, the upper limit of the content of Cr was 8.0 wt %.

Mo: 3.0 wt % or less

Mo was effective to increasing the temper softening resistance of the rolling contact element parts as was Cr, was required to produce the carbides in the surface layer of the rolling contact element parts, and was effective in achieving an improvement in the hardenability of the rolling contact element parts.

However, above 3.0 wt % content of Mo insignificantly increased the above operations and produced a macrocarbide in the rolling contact element parts in the stage of material of the rolling contact element parts so that the life of the rolling bearing was decreased. Thus, the upper limit of the content of Mo was 3.0 wt %.

Mn: 1.6 wt % or less

In-steel Mn largely contributed to an improvement in the hardenability of the rolling contact element parts. Mn is also inexpensive. However, a greater content of Mn was likely to produce a large content of a nonmetal inclusion and to increase the hardness of the rolling contact element parts and thereby decrease the foregeability and machinability of the rolling contact element parts. Thus, the upper limit of the content of Mn was 1.6 wt %.

O: 12 ppm or less

Since O produced an oxide or oxide-base nonmetal inclusion (especially $Al_2O_3$) which decreases the life of the rolling bearing made of the rolling element parts, the content of O was required to be as small as possible. Thus, the upper limit of the content of O was 12 ppm. It was preferably 9 ppm.

V: 1.0 wt % or less

V was significantly effective to an improvement in the temper softening resistance of the rolling contact element parts and precipitated in grain boundaries to thereby suppress a coarsening of crystal grains and to refine the crystal grains, and, also, bonded with in-steel carbon to produce a fine carbide. Adding V increased the hardness of the surface layer of the rolling contact element parts and thereby increased the wear resistance of the rolling contact element parts. Above 1.0 wt % content of V precipitated vanadium carbide in grain boundaries so as to deteriorate the workability and various mechanical properties of the rolling contact element parts. On the other hand, V is costly. Thus, the upper limit of the content of V was 1.0 wt %. The content of V was preferably 0.1–1.0 wt %.

In the present invention, the rolling contact element steel and the rolling contact element parts can include other elements, such as an inevitable impurity, in addition to the above elements. Ti, S and P exemplify the inevitable impurity.

Ti

Ti appeared as a nonmetal compound in the form of TiN. Since the hardness of TiN is high and the plasticity thereof is low, TiN was a source of stress concentration which decreased the life of the rolling bearing. Thus, the content of Ti was as much decreased as possible. The content of Ti was preferably 40 ppm.

P

Since P decreased the impact resistance of the alloy steel, the content of P was required to be decreased. Thus, the content of P was preferably 200 ppm or less.

S

S caused a sulfide-base nonmetal inclusion, e.g., MnS. MnS had a low hardness and a high plasticity so as to cause a cracking during a preworking, e.g., rolling and forging, of the rolling contact element parts. The content of S was required to be as much decreased as possible so that the cracking in the rolling contact element parts during preworking, e.g., forging, was prevented and a harder working of the rolling contact element parts could be conducted. Thus, the content of S was preferably 80 ppm.

In the present invention, the sequence of carburizing or carbonitriding, quenching and tempering at least one of the races and the rolling element produced fine spheroidal carbides in the surface layer of the one of the races and the rolling element parts.

The spheroidal carbides were hard and provided a good wear resistance to the rolling contact element parts to thereby increase the life of the rolling bearing. In addition, these carbides, which are fine, prevented a stress concentration caused by a load imposed on the rolling bearing which increased the life of the rolling bearing.

Carbides of the present invention comprise, e.g., $Cr_7C_3$, $Cr_3C_6$, $Mo_2C$, VC, $V_4C_3$, $Fe_3C$ and double carbides thereof.

Sizes of the carbides of the present invention (defined as ½ of the total of the maximum diameter and minimum diameter of each carbide) are preferably 0.5–1.0 μm.

The content of the carbides of the present invention present in the surface layer of the rolling contact element parts are preferably 20–50 vol %.

A desired surface hardness of the one of rolling contact element parts is 62–70 $H_RC$ in order to increase the life of the rolling bearing. Below 20 vol % content of the carbides failed to provide the desired surface hardness. On the other hand, above 50 vol % content of the carbides unpreferably caused the fine carbides to cohere and thereby coarsen so that the cohering carbides caused a stress concentration. Thus, the content of the carbides present in the surface layer of one of the rolling contact element parts was 20-50 vol %. This provided the rolling contact element with a surface hardness as high as 62-70 $H_RC$.

In accordance with the present invention, carburizing or carbonitriding alloy steels or rolling contact element parts of the compositions defined herein provided 0.6-0.8 wt % content of dissolved carbon or carbon-and-nitrogen with a 2.5-3.8 wt % total content of C present in the surface layer of the rolling contact element parts. Quenching and high-temperature tempering of the rolling contact element parts made of the resulting alloy steels precipitated the fine spheroidal carbides in the surface layer of the rolling contact element parts and provided 3 vol % content of retained austenite in the surface layer of the rolling contact element parts, because above 3 vol % content of retained austenite transforms to martensite at a high temperature to thereby significantly change the dimensions of the rolling contact element parts.

High-temperature tempering the rolling contact element parts transformed some of retained austenite to martensite so that the content of retained austenite present in the surface layer of the rolling contact element parts was 3 vol % or less. Since an insufficiently low temperature of tempering the rolling contact element parts insufficiently transformed retained austenite to martensite, the temperature of the high-temperature tempering was about 250°-550° C. and, preferably, was 400°-450° C.

In addition, the carburization and carbonitriding of the rolling contact element parts produced cores of carbides when the rolling contact element parts are heated above an $A_1$ transformation temperature and the subsequent quenching and tempering precipitated the fine spheroidal carbides in the surface layer of the rolling contact element parts. In addition, providing the 0.6-0.8 wt % content of dissolved carbon and concurrently the 2.5-3.8 wt % total content of C present in the surface layer of the rolling contact element parts provided the 20-50 vol % content of the carbides present in the surface layer of the rolling contact element parts.

DESCRIPTION OF THE PREFERRED EMBODIMENTS

The preferred embodiments of the present invention will be described hereinafter.

Sequentially carburizing, soaking, quenching and tempering bearings made of the alloy steels of the present invention and control bearings provided the inventive test pieces Nos. 1 and 2 and the control test pieces Nos. 3-12. Table 1 shows the compositions of the test pieces Nos. 1-12.

TABLE 1

| Test piece No. | C | Si | Mn | Cr | Mo | V | O | S | P |
|---|---|---|---|---|---|---|---|---|---|
| 1 | 0.39 | 1.18 | 1.06 | 6.21 | 2.10 | — | 9 | 30 | 130 |
| 2 | 0.40 | 1.20 | 1.09 | 6.21 | 2.09 | 0.2 | 10 | 40 | 130 |
| 3 | 1.01 | 0.25 | 0.38 | 1.49 | — | — | 10 | 40 | 130 |

TABLE 1-continued

| Test piece No. | C | Si | Mn | Cr | Mo | V | O | S | P |
|---|---|---|---|---|---|---|---|---|---|
| 4 | 0.21 | 0.24 | 0.75 | 1.04 | — | — | 11 | 40 | 130 |
| 5 | 0.82 | 0.18 | 0.24 | 4.21 | 4.40 | 1.05 | 8 | 30 | 110 |
| 6 | 0.40 | 1.20 | 1.10 | 2.43 | 2.10 | — | 9 | 40 | 120 |
| 7 | 0.41 | 1.18 | 1.07 | 6.21 | — | — | 9 | 40 | 130 |
| 8 | 0.41 | 1.18 | 1.09 | 9.38 | 4.21 | — | 10 | 40 | 130 |
| 9 | 0.40 | 1.19 | 1.10 | 6.23 | 2.12 | 1.4 | 9 | 40 | 130 |
| 10 | 0.40 | 1.19 | 1.92 | 6.18 | 2.11 | — | 10 | 40 | 120 |
| 11 | 0.40 | 1.20 | 1.08 | 6.20 | 2.10 | — | 18 | 40 | 130 |
| 12 | 0.41 | 1.18 | 1.09 | 6.20 | 2.10 | 0.06 | 9 | 40 | 130 |

Contents of O, S, and P are represented in ppm and those of the other elements in wt %.

Table 2 shows the conditions of heat treatment for each test piece. The conditions of heat treatment for the test piece No. 1 were as follows:

A direct quenching of a carburization was conducted under the atmosphere of Rx gas+ an enriching gas at 980° C. for about 10 hours. Then, an oil quenching was conducted, followed by triple temperings of 500° C.×2 hours. The test pieces Nos. 3 and 5 were quenched without carburization. The other test pieces Nos. 2, 4 and 6-12 were carburized under varied conditions and tempered at varied temperatures. A carbonitriding instead of carburization was conducted under the atmosphere of Rx gas+an enriching gas+5% ammonia at 830°-870° C. for about 3-5 hours and followed by the same steps as the steps subsequent to the direct quenching of the carburization.

Then, the surface hardnesses in $H_RC$ of the test pieces Nos. 1-12 were measured. Table 2 shows the results of this measurement.

Disc-shaped test pieces constituting the races of a rolling thrust bearing were made of the test pieces Nos. 1-12. The $L_{10}$ lives of the disc-shaped test pieces represented by a stress repetition cycle number were measured. In order to obtain a quasi-high-temperature life characteristic of each of the disc-shaped test pieces, the life of the disk-shaped test piece was measured at a 150° C. quasi-high temperature and at about a 25° C. room temperature. The conditions of the life measurement were as follows:

Testing machine: Thrust testing machine described on pages 10-21 of "Special Steels Manual", 1st edition edited by Electrosteelmaking Research Institute and published by Rikohgakusha on May 25, 1965;

Lubricating oil: FKB oil RO 150 in the case of 150° C. life test and FKB oil RO 80 in the case of room temperature life test;

Maximum surface pressure: 560 kg/mm² in the case of 150° C. life test and 530 kg/mm² in the case of room temperature life test;

Stress repetition cycle number: 3,000 cpm

Table 2 shows the life test lives of the test pieces.

TABLE 2

| Test piece No. | Conditions of heat treatment | | Hardness | |
|---|---|---|---|---|
| | Carburization | Tempering | $H_RC$ | $L_{10}$ life (cycle)*1 |
| 1 | 980° C. × 10 hr | 500° C. × 2 hr × 3 times | 62.7 | $1.7 \times 10^7$ ($1.0 \times 10^8$) |
| 2 | 980° C. × 10 hr | 500° C. × 2 hr × 3 times | 62.9 | $2.1 \times 10^7$ ($1.4 \times 10^8$) |
| 3 | 840° C. × 30 min*2 | 240° C. × 2 hr × | 59.2 | $2.1 \times 10^6$ ($9.8 \times 10^6$) |
| 4 | 930° C. × 5 hr | 240° C. × 2 hr × | 59.4 | $3.4 \times 10^6$ ($4.7 \times 10^7$) |

TABLE 2-continued

| Test piece No. | Conditions of heat treatment | | Hardness $H_RC$ | $L_{10}$ life (cycle)[*1] |
|---|---|---|---|---|
| | Carburization | Tempering | | |
| 5 | 1100° C. × 30 min[*2] | 550° C. × 2 hr × 3 times | 62.0 | $1.3 \times 10^7$ |
| 6 | 980° C. × 10 hr | 500° C. × 2 hr × 3 times | 60.9 | $1.0 \times 10^7$ |
| 7 | 980° C. × 10 hr | 500° C. × 2 hr × 3 times | 61.3 | $1.3 \times 10^7$ |
| 8 | 980° C. × 10 hr | 500° C. × 2 hr × 3 times | 62.9 | $1.6 \times 10^7$ |
| 9 | 980° C. × 10 hr | 500° C. × 2 hr × 3 times | 62.4 | $1.5 \times 10^7$ |
| 10 | 980° C. × 10 hr | 500° C. × 2 hr × 3 times | 62.3 | $6.2 \times 10^6$ |
| 11 | 980° C. × 10 hr | 500° C. × 2 hr × 3 times | 62.8 | $2.8 \times 10^6$ |
| 12 | 980° C. × 10 hr | 500° C. × 2 hr × 3 times | 62.6 | $1.6 \times 10^7$ |

[*1]The parenthesized values represent the results of room temperature life test; The unparenthesized values represent the results of 150° C. life test.
[*2]Quenching was conducted without carburization.

The relationship at the 150° C. quasi-high temperature between a stress repetition cycle number and a failure probability of a disc-shaped test piece due to flaking caused by a repeated stress in the disc-shaped test piece was tested with a plurality of disc-shaped test pieces made of each of the test pieces Nos. 1-9. FIG. 1 shows the result of this test.

Figure 2:
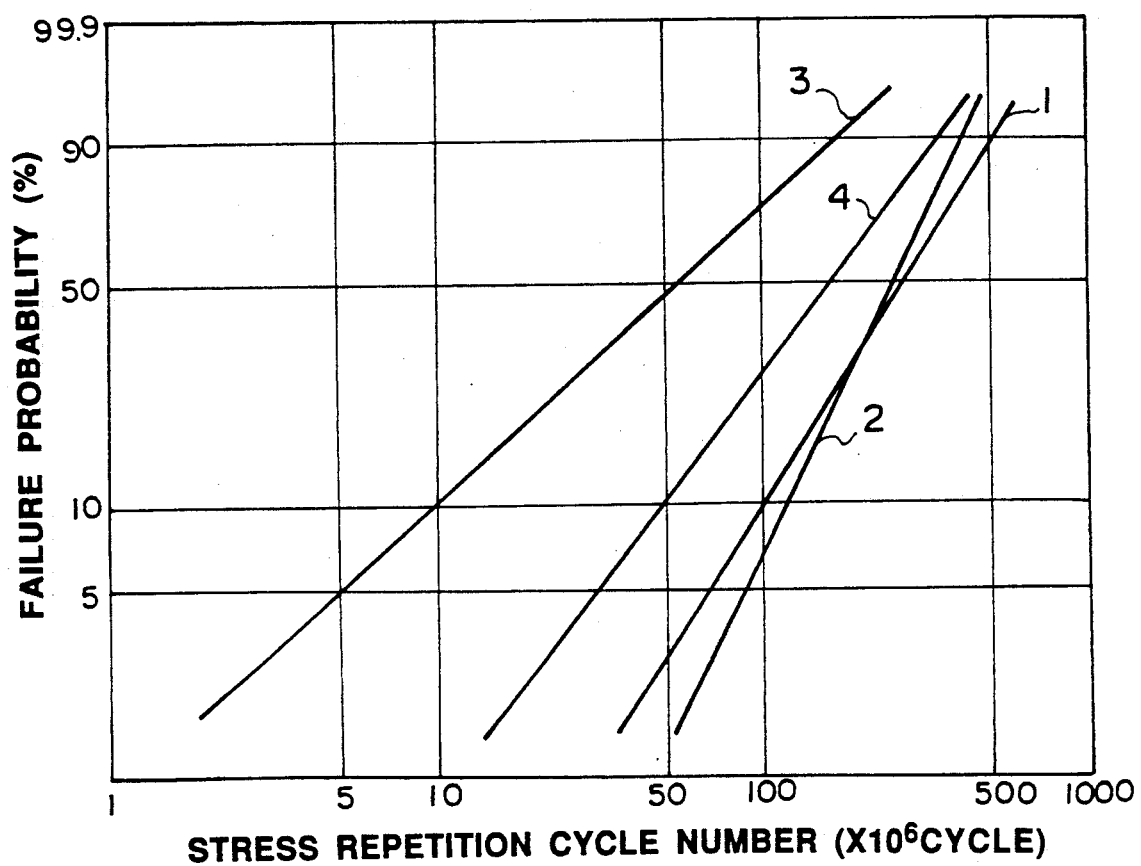
FIG. 2 is a characteristic graph of a rolling thrust bearing under a room-temperature service representing the results of a rolling thrust bearing life test in terms of a relationship between the stress repetition cycle number and the failure probability of the rolling thrust bearing.

On the other hand, the relationship at room temperature between a stress repetition cycle number and a failure probability of a disc-shaped test piece made of each of the test pieces Nos. 1-4 was tested in essentially the same manner as in the case shown in FIG. 1. FIG. 2 shows the result of this test. In FIGS. 1 and 2, reference numerals indicate corresponding test pieces.

Then, 6-mm bored small ball-bearings (686) were made of the test pieces Nos. 1-12. A wear resistance test of each of these small ball-bearings was then conducted. Conditions of the test were as follows:

Preload: 2 kgf, Oscillating angle: 8 degrees, Speed: 20 Hz, Under grease lubrication, Evaluation cycles: $2 \times 10^7$, Temperature: room temperature, and Number of manufactured small ball-bearings for each of the test pieces: 8.

Table 3 shows results of the wear resistance test.

TABLE 3

| | Presence or absence of fretting | |
|---|---|---|
| Test piece No. | Fretting present | Fretting absent |
| 1 | 1 | 7 |
| 2 | 0 | 8 |
| 3 | 7 | 1 |
| 4 | 6 | 2 |
| 5 | 4 | 4 |
| 6 | 3 | 5 |
| 7 | 2 | 6 |
| 8 | 0 | 8 |
| 9 | 1 | 7 |

The values in the fretting-present column represent the number of ball bearings experiencing a fretting. The values in the fretting-absent column represent the number of ball bearings experiencing no fretting.

Figure 3:
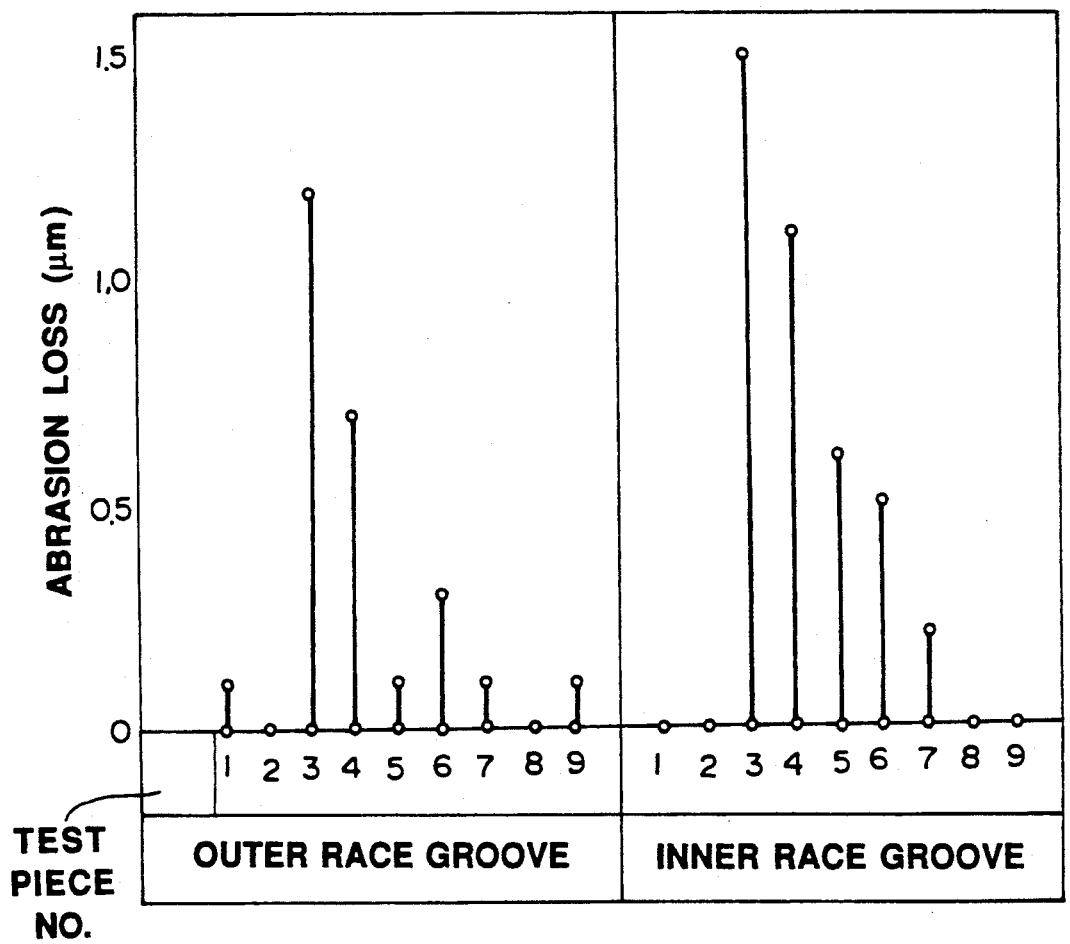
FIG. 3 is a graph representing abrasion losses in the inner and outer races of a rolling thrust bearing caused by fretting.

Abrasion Loss Caused By Fretting: FIG. 3 depicts abrasion losses caused by a fretting in the grooves in the inner and outer races of each of the small ball-bearings. Each of the abrasion losses shown in FIG. 3 represents an average abrasion loss of 8 small ball-bearings made of the same test piece.

The results of the wear resistance test conducted on the test pieces Nos. 1-12 will be analyzed hereinafter.

Since the test piece No. 1 precipitated fine carbides in the surface layer thereof and included the elements increasing the temper softening resistance of test piece No. 1 as shown in Table 1, the surface hardness of the test piece No. 1 was as high as 62.7 $H_RC$ even when the test piece No. 1 was high-temperature tempered. In addition, the high-temperature tempering decreased the content of retained austenite.

Since the surface hardness of the test piece No. 1 was thusly good and the carbide present in the surface of the test piece No. 1 was fine, the results of the 150° C. quasi-high-temperature and room-temperature life tests represented good values. Thus, as seen in FIG. 1, the high-temperature failure probability of the small ball-bearing made of the test piece No. 1 to stress repetition cycle number was low. Likewise, as seen in FIG. 2, the room temperature failure probability of the small ball-bearings made of the test piece No. 1 to stress repetition cycle number was also low.

Since the surface layer of the test piece No. 1 included fine spheroidal carbides, the number of frettings caused in the small ball-bearing made of the test piece No. 1 is as low as 1 as shown in Table 3 and the abrasion loss in the small ball-bearing was low as shown in FIG. 3. Thus, the wear resistance of the test piece No. 1 was good.

The test piece No. 2 differed from the test piece No. 1 in that the test piece No. 2 further included 0.2 wt % V. V not only produces fine vanadium carbides; but, also, prevents a coarsening of crystal grains so as to refine the fine vanadium carbides. Thus, as shown in Table 2, the $H_RC$ hardness after high-temperature tempering of the test piece No. 2 was good and the content of retained austenite of the test piece No. 2 was as low as those of the test piece No. 1. since the carbides in the test piece No. 2 were so refined as to moderate stress concentration, the quasi-high-temperature and the room-temperature $L_{10}$ lives of the small ball-bearings made of the test piece No. 2 were good.

As shown in FIGS. 1 and 2, the characteristic of the failure probability to stress repetition cycle number of the small ball-bearing made of the test piece No. 2 was as good as that of the small ball-bearing made of the test piece No. 1. As shown in Table 3 and FIG. 3, the wear resistance of the test piece No. 2 was slightly better than that of the test piece No. 1.

The test piece No. 3 was made of high carbon chromium bearing steel (i.e., JIS-SUJ2) and provided a control. While high-temperature tempering of the test piece No. 3 decreased the content of retained austenite, the hardness of the test piece No. 3 was as low as 59.2 $H_{RC}$. Since the content of Cr in the test piece No. 3 to produce a chromium carbide was below the inventive range, the content of the carbides also was low. The content of Si to increase the high-temperature temper softening resistance of the test piece No. 3 was low resulting in poor quasi-high-temperature and room-temperature $L_{10}$ lives of the test piece No. 3 as shown in Table 2. as shown in FIGS. 1 and 2, the characteristic of the failure probability to stress repetition cycle number of the test piece No. 3 was much worse than that of the test pieces Nos. 1 and 2. As shown in Table 3, the number of frettings caused in the small ball-bearings made of the test piece No. 3 was great and, as shown in FIG. 3, the abrasion loss caused in the small ball-bearings made of the test piece No. 3 was high.

The test piece No. 4 was made of case hardened steel (i.e., JIS-SCR420) and provided a control. Since the contents of Si and Cr in the test piece No. 4 contributing to an increase in the temper softening resistance of the test piece No. 4 were below the inventive ranges and the content of Cr in the test piece No. 4 was low, the content of the carbides produced in the surface layer of the test piece No. 4 was low.

Thus, as shown in Table 2, the $H_RC$ hardness of the test piece No. 4 was lower than that of the test pieces Nos. 1 and 2 and the quasi-high-temperature and room-temperature $L_{10}$ lives of the test piece No. 4 were low. As shown in FIGS. 1 and 2, the characteristic of the failure probability to stress repetition cycle number of the test piece No. 4 was much worse than that of the test pieces Nos. 1 and 2. As shown in Table 3, the number of frettings caused in the small ball-bearings made of the test piece No. 4 was great and, as shown in FIG. 3, the abrasion loss caused in the small ball-bearings made of the test piece No. 4 was high.

Test piece No. 5 was made of M50 high-temperature bearing high-speed steel and provided a control.

Since the large content of C in the test piece No. 5 produced a macrocarbide in the test piece No. 5 in the stage of material of the test piece No. 5 for the small ball-bearings, the test piece No. 5 was quenched at 1,100° C. in order to dissolve the macrocarbide in the matrix of the test piece No. 5.

Thus, the heat treatment for the test piece No. 5 was complicated.

Since the contents of Si and Cr were below the lower limits of the present invention, the size of the carbides present in the test piece No. 5 was greater than those of the carbides present in the test pieces Nos. 1 and 2 and decreased the life of the test piece No. 5 as shown in Table 2. As shown in FIG. 1, the characteristic of the failure probability to stress repetition cycle number of the test piece No. 5 was much worse than that of the test pieces Nos. 1 and 2. As shown in Table 3, the number of frettings caused in the small ball-bearings made of the test piece No. 5 was great and, as shown in FIG. 3, the abrasion loss caused in the small ball-bearings made of the test piece No. 5 was high.

Test piece No. 6 provided a control including a lower content of Cr. The lower the content of Cr, the lower the degree of improvement in the temper softening resistance of the rolling contact element parts. In addition, the low content of Cr precipitated an insufficient content of the carbides in the test piece No. 6. Thus, as shown in Table 2, the hardness of the test piece No. 6 was lower than that of the test pieces Nos. 1 and 2 and the life of the test piece No. 6 was shorter. As shown in FIG. 1, the characteristic of the failure probability to stress repetition cycle number of the test piece No. 6 was much worse than that of the test pieces Nos. 1 and 2. As shown in Table 3, the number of frettings caused in the small ball-bearings made of the test piece No. 6 was great and, as shown in FIG. 6, the abrasion loss caused in the small ball-bearings made of the test piece No. 6 was high.

Test piece No. 7 provided a control lacking Mo. The hardenability of the test piece No. 7 was low because of the lack of Mo and the degree of improvement in the temper softening resistance of the test piece No. 7 was low. Thus, as shown in Table 2, the hardness of the test piece No. 7 was lower than that of the test pieces Nos. 1 and 2 and the life of the small ball-bearings made of the test piece No. 7 was shorter. As shown in FIG. 1, the characteristic of the failure probability to stress repetition cycle number of the test piece No. 7 was much worse than that of the test pieces Nos. 1 and 2. As shown in Table 3, the number of frettings caused in the small ball bearings made of the test piece No. 7 was great and, as shown in FIG. 3, the abrasion loss caused in the small ball-bearings made of the test piece No. 7 was high.

Test piece No. 8 provided a control in which the contents of Cr and Mo exceeded the upper limits of the ranges of the present invention. Significantly greater contents of Cr and Mo can produce macrocarbides thereof. While the hardness of the test piece No. 8 was as good as that of the test pieces 1 and 2, the macrocarbides present in the test piece No. 8 correspondingly increased the degree of stress concentration. Thus, the life of the test piece No. 8 was slightly shorter than those of the test pieces Nos. 1 and 2. As shown in FIG. 1, the characteristic of the failure probability to stress repetition cycle number of the test piece No. 8 was good. As shown in Table 3, the number of frettings caused in the small ball-bearings made of the test piece No. 8 was small and, as shown in FIG. 3, the abrasion loss caused in the small ball-bearings made of the test piece No. 8 was small. However, adding amounts of Cr and Mo exceeding the inventive ranges is costly.

Test piece No. 9 provided a control in which the content of V exceeded the upper limit of the inventive range.

However, the greater content of V failed to increase the hardness of the test piece No. 9 so that the hardness and the life of the test piece No. 9 essentially equalled that of the test pieces Nos. 1 and 2. As shown in FIG. 1, the characteristic of the failure probability to stress repetition cycle number of the test piece No. 9 essentially equalled that of the test pieces Nos. 1 and 2. As shown in Table 3, the number of frettings caused in the small ball-bearings made of the test piece No. 9 essentially equalled that of the test pieces Nos. 1 and 2 and, as shown in FIG. 3, the abrasion loss caused in the small ball-bearings made of the test piece No. 9 essentially equalled that of the test pieces Nos. 1 and 2.

Test piece No. 10 provided a control in which the content of Mn exceeded the inventive range of the present invention. The increased content of MnS or MnS-based inclusions present in the test piece No. 10 decreased the $L_{10}$ life of the test piece No. 10.

Test piece No. 11 provided a control in which the content of O exceeded the inventive range. The increased content of $Al_2O_3$ or $Al_2O_3$-base inclusions present in the test piece No. 11 decreased the $L_{10}$ life of the test piece No. 11.

Test piece No. 12 provided a control in which the content of V was below that of test piece No. 2. The $L_{10}$ life of the test piece No. 12 was slightly lower than that of the small ball-bearing of test piece No. 2, which, however, is good.

In the rolling fatigue life test described with reference to Table 2, the life of each of the disc-shaped test pieces was measured. On the other hand, the rolling life test of the test pieces in the form of a rolling element made of the same materials as listed in Table 2 was conducted, resulting in essentially the same measurements as in the case of the life test of the disc-shaped test pieces.

In the wear resistance test, the overall rolling contact elements parts of each of the rolling bearings, i.e., the races and the rolling element, were made of the test pieces Nos. 1 and 2. However, when at least one of the races and the rolling element is made of a rolling contact element steel of the present invention, it provided essentially the same good wear resistance as the embodiment of the present invention.

In the above-described embodiment, the life test of the test pieces was conducted at the 150° C. quasi-high temperature. Even when the life test of the test pieces was conducted at 200°–500° C., it provided essentially the same good results.

I claim:

1. A rolling bearing, comprising:
   races; and
   rolling elements, at least one of said races and said rolling elements being made of an alloy steel consisting essentially of: C: about 0.2–0.6 wt %; Si: about 0.5–2.0 wt %; Cr: about 5.0–8.0 wt %; Mo: not more than about 3.0 wt %; Mn: not more than about 1.6 wt %; O: not more than about 12 ppm; and the balance of Fe and any inevitable impurity, the at least one of said races and said rolling elements being carburized or carbonitrided, then quenched and then high-temperature tempered such that carbides are deposited in the surface layer of the at least one of said races and said rolling elements, the size of the carbide particles being about 0.5–1.0 μm in diameter, and the content of the carbides being about 20–50 Vol %.

2. The rolling bearing as defined in claim 1 wherein the alloy steel further consists essentially of V: not more than about 1.0 wt %.

3. The rolling bearing as defined in claim 1 wherein the temperature of the high-temperature tempering is between about 250°–550° C. and the content of retained austenite present in the surface layer of the alloy steel which has been heat treated is not more than about 3 vol %.

4. The rolling bearing as defined in claim 1 wherein the alloy steel further consists essentially of V: not more than about 1.0 wt %, and the temperature of the high-temperature tempering is between about 250°–550° C., and the content of retained austenite present in the surface layer of the alloy steel which has been heat treated is not more than about 3 vol %.

* * * * *